(12) United States Patent
Tew et al.

(10) Patent No.: US 9,266,569 B1
(45) Date of Patent: Feb. 23, 2016

(54) VEHICLE PILLAR REINFORCEMENT MEMBER

(71) Applicant: Toyota Motor Engineering & Manufacturing North America, Inc., Erlanger, KY (US)

(72) Inventors: Brian L. Tew, Ann Arbor, MI (US); Jonathan R. Young, Saline, MI (US); Matthew C. Tier, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/505,210

(22) Filed: Oct. 2, 2014

(51) Int. Cl.
*B62D 25/08* (2006.01)
*B62D 27/02* (2006.01)
*B62D 25/04* (2006.01)
*B62D 25/06* (2006.01)

(52) U.S. Cl.
CPC .............. *B62D 27/023* (2013.01); *B62D 25/04* (2013.01); *B62D 25/06* (2013.01)

(58) Field of Classification Search
CPC ....... B62D 25/04; B62D 27/02; B62D 27/203
USPC ............. 296/203.01, 203.03, 193.05, 193.06, 296/187.13
See application file for complete search history.

(56) References Cited

U.S. PATENT DOCUMENTS

| | | | |
|---|---|---|---|
| 4,355,844 A | 10/1982 | Muzzarelli | |
| 4,634,173 A * | 1/1987 | Aonuma et al. | 296/203.04 |
| 4,660,345 A | 4/1987 | Browning | |
| 4,775,181 A * | 10/1988 | Shoda | 296/203.04 |
| 4,883,310 A * | 11/1989 | Miyazaki et al. | 296/210 |
| 5,855,407 A * | 1/1999 | Fukuda | 296/203.03 |
| 6,282,790 B1 | 9/2001 | Jaekel et al. | |
| 6,578,909 B1 * | 6/2003 | Reed et al. | 296/210 |
| 6,679,546 B2 | 1/2004 | Mishima et al. | |
| 6,827,390 B2 | 12/2004 | Zummallen et al. | |
| 7,503,623 B2 | 3/2009 | Favaretto | |
| 8,186,752 B2 | 5/2012 | Baccouche et al. | |
| 8,439,432 B2 | 5/2013 | Nusier et al. | |
| 8,641,133 B1 | 2/2014 | Scaringe et al. | |
| 8,662,567 B2 | 3/2014 | Aul et al. | |
| 2012/0086238 A1 | 4/2012 | Tan | |

* cited by examiner

*Primary Examiner* — Dennis H Pedder
(74) *Attorney, Agent, or Firm* — Christopher G. Darrow; Darrow Mustafa PC (57) ABSTRACT

A rear corner vehicle roof structure includes a rear structural pillar and a small cap-like reinforcement member. The rear pillar includes a vertically elongated base portion which transitions into a bifurcated upper end portion forming a longitudinally extending stub arm which is affixed to an associated side roof rail and a laterally extending stub arm which is affixed to an associated rear roof header. The reinforcement member includes a central bridge portion trifurcated to form extensions conforming to the pillar upper portion, the longitudinally extending stub arm and the laterally extending stub arm. The reinforcement member further includes peripherally flanged web segments disposed between circumferentially adjacent pairs of the pillar base portion, longitudinal and lateral stub arms. The flanged web segments are affixed to opposed continuous flange portions of the upper end portion and configured to support the central bridge portion in a spaced relation from the upper end portion.

19 Claims, 9 Drawing Sheets

VEHICLE PILLAR REINFORCEMENT MEMBER

TECHNICAL FIELD

The present disclosure relates to a roof structure of a vehicle body in general and an apparatus for reinforcing a roof structure of a vehicle body in particular.

BACKGROUND

Vehicle safety standards have evolved in an effort to provide safer passenger cars. A vehicle safety standard for roof crush resistance is FMVSS No. 216. The loading requirements of FMVSS No. 216 have been increased with the objective of providing greater protection for passengers in vehicle rollover events. The FMVSS standard will require that all vehicles meet a roof strength requirement of 3.0 times the vehicle weight. This requirement increase poses a significant challenge to all vehicle manufacturers. Increased roof strength requirements must be met while also achieving increased fuel economy that may demand lighter weight structures in the overall vehicle.

Large passenger vehicles often have three or more sets of vertical pillars supporting the roof structure. Pillars are typically referred to from front to rear as A, B, and C-pillars. Some vehicles also employ a fourth, D-pillar. In contrast, some small vehicles with only one row of doors have only two pillars. Vehicles with front and rear side doors generally have a middle B-pillar. The B-pillar defines the separation between separate front and rear door openings. Existing roof structures rely substantially on a mid-vehicle vertical B-pillar to sustain vertical roof crash loads. The size of the B-pillar required to meet roof crush requirements may obstruct access to the vehicle by occupants. It generally restricts the space available for door openings, and therefore the ease of entry and exit by the occupants of the vehicle. The B-pillar also limits the size of objects that are capable of being loaded through the door openings. The B-pillar may also obstruct the driver's field of view. The B-pillar also presents vehicle styling limitations, since its placement is often dictated by functional requirements. Although the B-pillar has been eliminated in certain vehicle types, such as light trucks, offering several styling and space advantages, meeting increasing roof strength requirements remains problematic.

One known vehicle roof system enabling elimination of the B-pillar transfers vertical roof loads onto an enhanced rear structure of the vehicle. An aspect of this system is the addition of upper cap reinforcement directly to assume roof crush loads applied at the front of the vehicle roof during testing. A specific load transfer mechanism is incorporated wherein vertical roof crush force applied near the front of the vehicle is transferred into both a torsional load upon a rear header of the vehicle and a bending moment upon the C-pillar of the vehicle. Although this system enabled elimination of the B-pillar, it does so by increasing the mass and complexity of the upper rear structure of the vehicle roof. For example, it requires several discrete elongated structural elements to form the C-pillar and the adjacent side and rear frames.

Conventional body frames are typically fabricated as multiple stamped sheet metal parts that are generally spot welded together. It is possible to improve the strength of conventional body frames by forming the sheet metal parts from high grade material such as dual phase and boron steels. Body frames may also be made stronger by using thicker gauge sheet metal components. However, the use of high strength alloys and thicker sheet metal may increase the weight of the vehicle and also increase the cost to manufacture the body frame. Even with the use of thicker alloy components, the roof portions of conventional design body frames may not always meet stringent test requirements for roof crush performance.

Although stamped members have been used in vehicle body structures for years, hydroformed components or members may be used in vehicles. Hydroforming is a cost effective way of shaping malleable metals into lightweight, structurally stiff and strong elements. One of the largest applications for hydroforming is the automotive industry, which makes use of complex shapes possible by hydroforming to produce stronger, lighter and more rigid unibody structures for vehicles.

Hydroforming allows complex shapes to be formed, which would be difficult to manufacture with standard solid die stamping. Furthermore, hydroformed parts can often be made with a higher stiffness to weight ratio and at a lower per unit cost than traditional stamped or stamped and welded parts.

Another known vehicle roof system configuration employs a roof rail integral with an A-pillar and a support pillar. The structure further includes a cross member. The A-pillar includes an inner surface, an outer surface, and a wall there between. The roof rail extends downwardly at a front end of the roof rail and extends downwardly at a rear end of the roof rail. The roof rail is integral to a one piece hollow A-pillar at the front end of the roof rail. The support pillar also includes an inner surface, an outer surface, and a wall there between. The support pillar also includes a tubular lower section that extends upwardly from the rocker. The upper section of the support pillar is integral to the rear end of the roof rail. Although providing certain advantages, this system can prove difficult to fabricate.

SUMMARY

A vehicle body structure having improved roof support is provided according to the embodiment disclosed herein. The upper end of a corner pillar is bifurcated into a longitudinally directed stub arm for supporting a side roof rail and a laterally directed stub arm for supporting a roof header. Peripheral segments of a reinforcement member are affixed to the corner pillar.

According to an embodiment of the description, a corner vehicle roof structure includes a corner pillar including base portion transitioning into a longitudinally extending stub arm affixed to an associated side roof rail and a laterally extending stub arm affixed to an associated roof header. A reinforcement member including peripherally flanged web segments is affixed to the corner pillar at discrete locations intermediate circumferentially adjacent pairs of the pillar base portion and stub arms, wherein the flanged web segments are affixed to the upper end portion and configured to support the central bridge portion in a spaced relation from the upper end portion.

According to another embodiment of the disclosure, a rear corner vehicle roof structure includes a rear pillar including a vertically elongated base portion transitioning into a bifurcated upper end portion forming a longitudinally extending stub arm affixed to an associated side roof rail and a laterally extending stub arm affixed to an associated rear roof header. A reinforcement member includes a central bridge portion which is trifurcated to form extensions aligning and registering with the pillar upper end portion, the longitudinally extending stub arm and the laterally extending stub arm. The reinforcement member further includes peripherally flanged web segments disposed intermediate circumferentially adjacent pairs of the pillar base portion and stub arms. The flanged web segments are affixed to the upper end portion and configured to support the central bridge portion in a spaced, generally parallel relation from the upper end portion.

According to yet another embodiment of the disclosure, a vehicle roof structure includes a left rear pillar and a right rear pillar, wherein each rear pillar is longitudinally spaced from a respective left front pillar and a right front pillar, and wherein said front and rear pillars provide vertical support of the roof structure. A left side roof rail extends longitudinally between the left front and left rear pillars and a right side roof rail extends longitudinally between the right front and right rear pillars. A front edge roof header extends laterally between the left and right front pillars, and a rear edge roof header extends laterally between the left and right rear pillars. The left and right rear pillars each comprise a vertically elongated base portion transitioning into a bifurcated upper end portion forming a longitudinally extending stub arm affixed to an end of an associated roof rail and a laterally extending stub arm affixed to an end of said rear roof header. Lastly, the left and right rear pillars each further comprise a reinforcement member including a central bridge portion trifurcated to form extensions aligned and registering with an associated pillar base portion, an associated longitudinally extending stub arm and an associated laterally extending stub arm. Each said reinforcement member also includes peripherally flanged web segments disposed intermediate circumferentially adjacent pairs of the associated pillar base portion and stub arms. The flanged web segments are affixed to the associated upper end portion and configured to support the central bridge portion in a spaced relation from the associated upper end portion.

These and other features and advantages of the disclosure will become apparent upon reading the following specification, which, along with the drawings, describes an embodiment of the disclosure in detail.

BRIEF DESCRIPTION OF THE DRAWINGS

The present apparatus will now be described, by way of example, with reference to the accompanying drawings, in which.

Although the drawings represent embodiments of the present apparatus and method, the drawings are not necessarily to scale and certain features may be exaggerated in order to illustrate and explain the present disclosure. The exemplification set forth herein illustrates an embodiment of the apparatus and method, in one form, and such exemplifications are not to be construed as limiting the scope of the present apparatus and method in any manner.

DETAILED DESCRIPTION

The present disclosure describes a reinforcement member, a.k.a. a "section shear member", which overlays the "Y" shaped upper end of a vehicle body frame C-pillar joining the rear roof header and a side roof support member. The reinforcement member provides a mass-efficient reinforcement of the C-pillar, absorbing roof crush forces by resisting rotation of the C-pillar and buckling of the rear header. The reinforcement member includes a peripheral flange providing welding surfaces and a plurality of ribs increasing tensile strength, directing roof crush forces through the "Y" shaped upper end of a vehicle body frame C-pillar and resisting the onset of rear glass breakage.

The vehicle body frame includes a roof frame having a front header, a rear header and side supports extending between the front and rear headers. The rear header extends between the sides of the vehicle and defines a top structure for the rear window. The C-pillars define the side structures of the rear window. Each C-pillar has an upper end which is generally split so as to define a "Y" shape. Each end of the C-pillar is attached to an end of a respective rear header and side support. Typically, the frame is assembled by welding the parts together. The "Y" shape is subjected to complex loading (e.g., rotation+bending+twist) which, in turn, may cause the rear header to buckle, resulting in rear, sliding glass breakage.

The reinforcement member provides a structural support for the "Y" which counters the complex force (i.e., rotation+ bending) so as to prevent or delay the rear header from buckling. This delays rear glass breakage, improving peak load for roof strength tests.

A frame assembly having a reinforcement member (e.g., section shear member) is provided. The frame assembly includes a C-pillar, a rear header and a side support, all of which defines a rear side portion of the vehicle frame. The C-pillar includes an end portion having a "Y" shape, wherein the ends of the "Y" (e.g., the prongs or stub arms) are welded to the ends of the respective rear header and side support. The reinforcement member is mounted to a medial surface of the C-pillar. Specifically, the reinforcement member is generally centered on the "Y". The reinforcement member includes a peripheral flange having a welding surface for attachment to the outer edges of the "Y" shape of the C-pillar. The body of the reinforcement member may include a plurality of shaped ribs configured to increase the tensile strength of the reinforcement member and absorb complex loading (i.e., twisting+bending+rotation) of the C-pillar.

The reinforcement member provides structural reinforcement to the "Y" portion of the C-pillar, where because of the attachments to the rear header and the side support, a complex force is applied during an impact. The reinforcement member provides a mass-efficient reinforcement of the C-pillar of the vehicle which delays rear glass breakage which would otherwise cause peak load to drop.

In the following Detailed Description, reference is made to the accompanying drawings, which form a part thereof, and in which is shown by way of illustration specific embodiments in which the disclosure may be practiced. In this regard, directional terminology, such as "top", "bottom", "front", "back", "leading", "trailing", etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. Furthermore, the axes (e.g., ±X, ±Y, and ±Z axes) are referenced on the drawings to provide a relative directional sense only. The following detailed description, therefore, is not to be taken in a limiting sense, and the scope of the present invention is defined by the appended claims.

For purposes of providing non-limiting definition and to enable clear understanding of the present disclosure, "longitudinal" means parallel to the direction of the Y axis, "lateral" means parallel to the direction of the X axis, and "vertical" means parallel to the direction of the Z axis.

Figure 1:
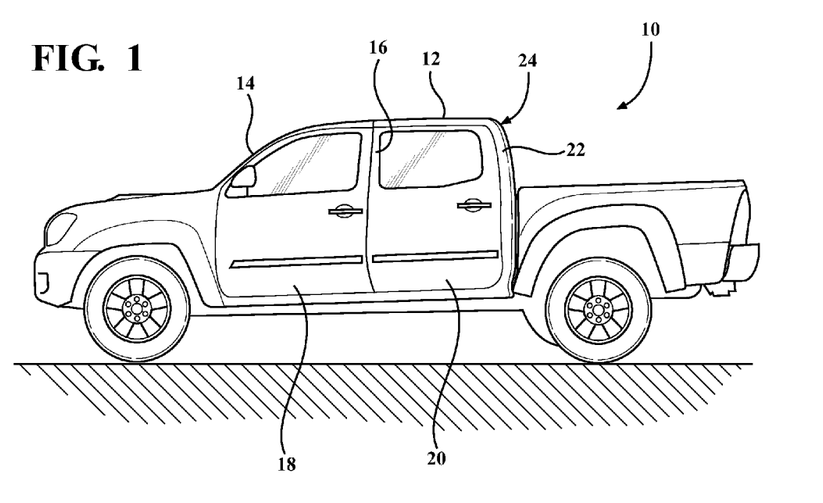
FIG. 1 is a left (e.g., driver's) side elevation view of an exterior of a vehicle.

Referring to FIG. 1, a vehicle (e.g., a pick-up truck) 10 has a roof 12 vertically supported by left and right side A-pillars 14 located at the forward end of the vehicle cabin, left and right side B-pillars 16 located at a longitudinally intermediate location of the vehicle cabin between front and rear sets of passenger doors 18 and 20, respectively, and left and right side C-pillars 22 located at the rearward end of the vehicle cabin. A principle application of the present disclosure is in a region 24 adjacent the upper portion of the left and right side C-pillars 22.

Figure 2:
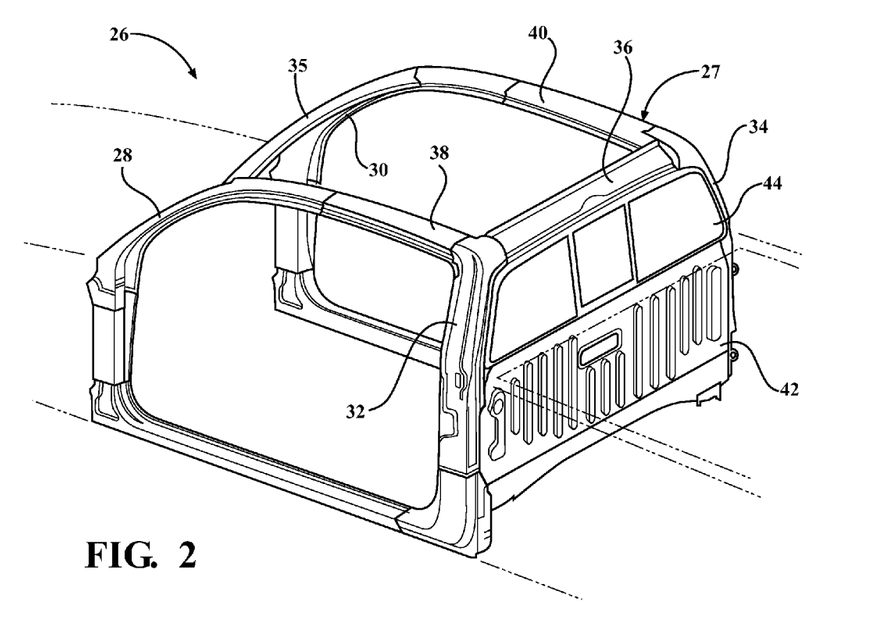
FIG. 2 is a left-rear side isometric view of the cabin structure similar to that of the vehicle of FIG. 1, including the rear wall panel and rear glass panels.

Referring to FIG. 2, an isometric view of a vehicle cabin reinforcement sub-structure is indicated generally at 26. Panels forming the outer surfaces of the cabin are deleted for purposes of illustrating roof vertical support elements in the present disclosure which include only left and right A-pillars 28 and 30, respectively, and left and right C-pillars 32 and 34, respectively. No B-pillars are illustrated for purposes of clarity in the present disclosure. The vehicle cabin reinforcement substructure 26 forms a roof frame including a front edge roof header 35 extending laterally between the upper terminus of the left and right A-pillars 28 and 30, respectively, a rear edge roof header 36 extending laterally between the upper terminus of left and right C-pillars 32 and 34, respectively, a left side roof support rail 38 extending longitudinally between the upper terminus of the left A-pillar 28 and the upper terminus of the left C-pillar 32, and a right side roof support rail 40 extending longitudinally between the upper terminus of the right A-pillar 30 and the upper terminus of the right C-pillar 34. A rear closure panel 42 extends laterally between the lower portions of the left C-pillar 32 and the right C-pillar 34. The rear edge roof header 36 defines a top structure for a rear window 44. The left and right C-pillars 32 and 34, respectively, define the side structures of the rear window 44.

The most rigorous loads encountered by vehicle roof 12 previously described tend to occur during a vehicle rollover event. Federal Motor Vehicle Safety Standard (FMVSS) No. 216 is intended to simulate loads that occur when a vehicle roof 12 strikes the ground during a rollover event. The Standard requires minimum roof strength as a ratio of vehicle weight. Additionally, the Insurance Institute of Highway Safety (IIHS) publishes its own stringent roof strength requirement. While not mandatory, the latter rating is highly influential in customer decisions, and beneficial for manufacturers to have a high rating. Both tests are performed with essentially the same procedure, but demand different performance levels.

Figure 5:
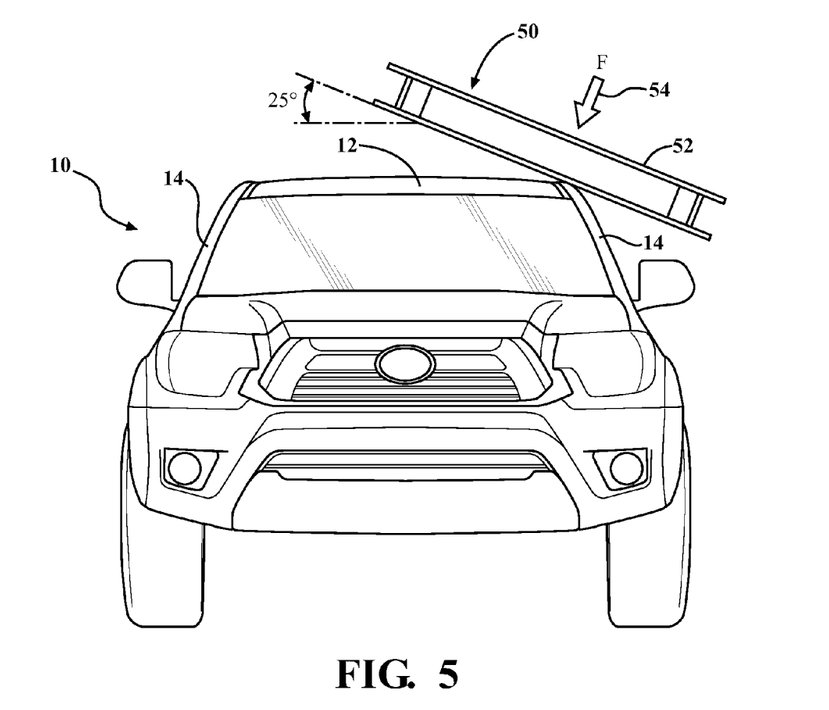
FIG. 5 is a front elevation view of the exterior of the vehicle of FIG. 1 disposed within a standard roof strength test fixture.

Referring to FIG. 5, an example roof strength test fixture 50 is illustrated. A large steel plate 52 of the test fixture 50 having prescribed dimensions and orientation is placed in contact with one side of the roof 12 of the vehicle 10. During a roof strength test, the steel plate 52 is displaced downwardly along a prescribed angle and applies a steadily increasing force indicated by arrow 54, as the steel plate 52 travels. This simulates contact of the roof 12 with the ground during a vehicle rollover event. For top scores the test standard may require that a force as much as 4.0 times the unloaded weight of the vehicle must be achieved before the steel plate 52 travels 5 inches (127 millimeters) from the point of initial contact. For light duty trucks with a 6000 pound maximum weight, 107,018 newtons may be required.

Figure 4:
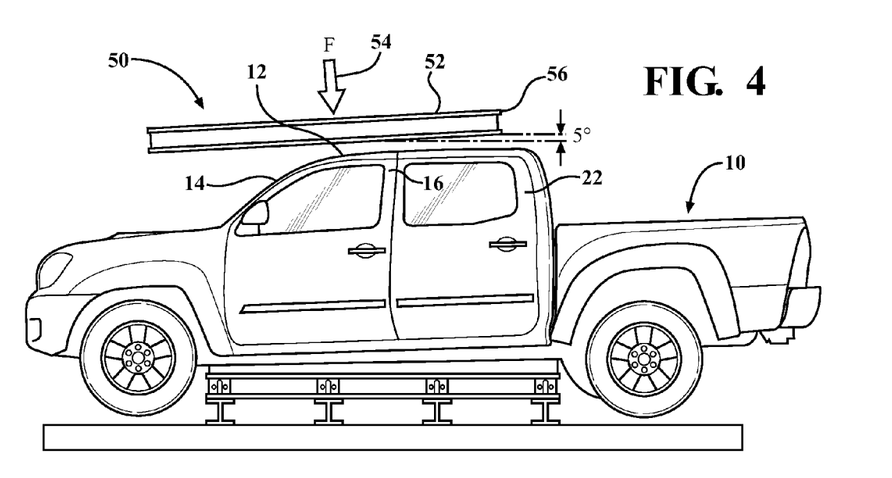
FIG. 4 is a left side elevation view of the exterior of the vehicle of FIG. 1 disposed within a standard roof strength test fixture.

Referring to FIG. 4, a side view of the standard roof strength test fixture 50 is illustrated. The location of the rearmost edge 56 of the steel plate 52 in relation to the full vehicle 10 may be estimated based on test setup protocol. The resultant position of the rearmost edge 56 of the steel plate 52 is an intermediate position between the B-pillar 16 and the C-pillar 22 for longer vehicles.

The rear portion of the body structure may be employed to provide stiffness resistant to roof crush loads. Loads applied at the forward part of the roof 12 near the windshield generally do not receive resistance from the rear portion of the vehicle 10. The center structure commonly assumes a large portion of the strength requirement through column loading on vehicles with a B-pillar 16. It is desirable in some cases to eliminate the B-pillar 16 from the vehicle 10. However, a load management strategy is required to meet structural demands.

Figure 3:
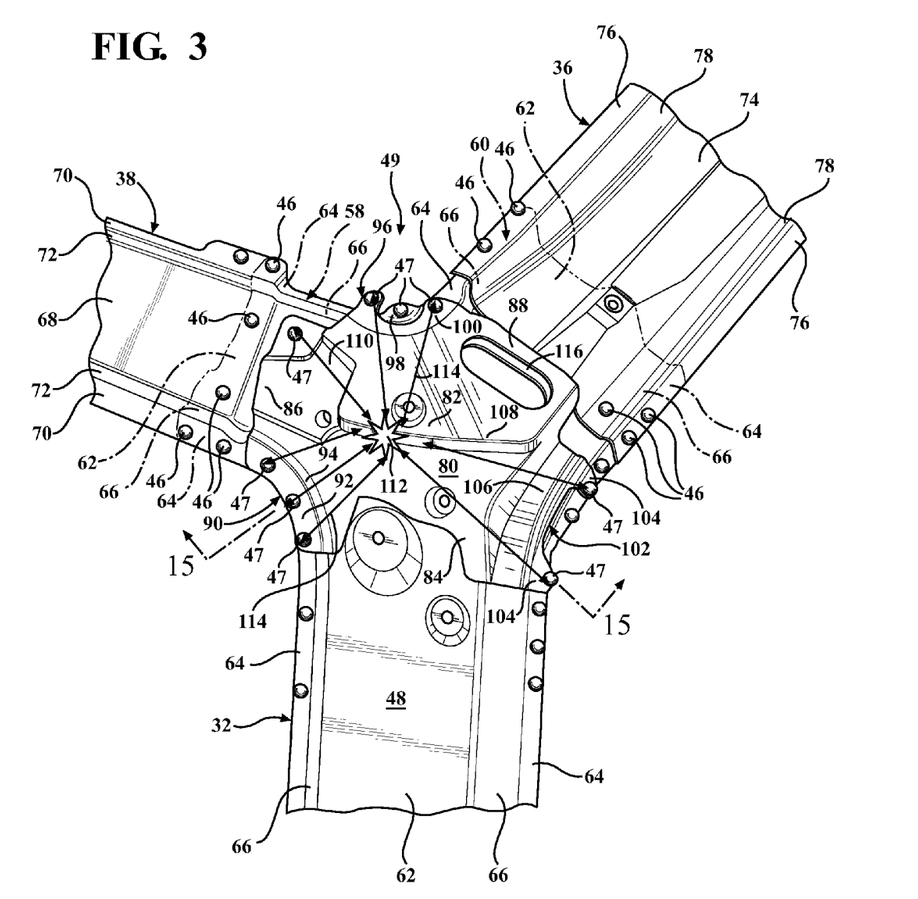
FIG. 3 is broken perspective view of a reinforcement member (e.g., section shear member) structurally incorporated with a rear upper side panel (e.g., C-pillar) of the cabin structure of FIG. 2 from an exterior perspective.
Figure 15:
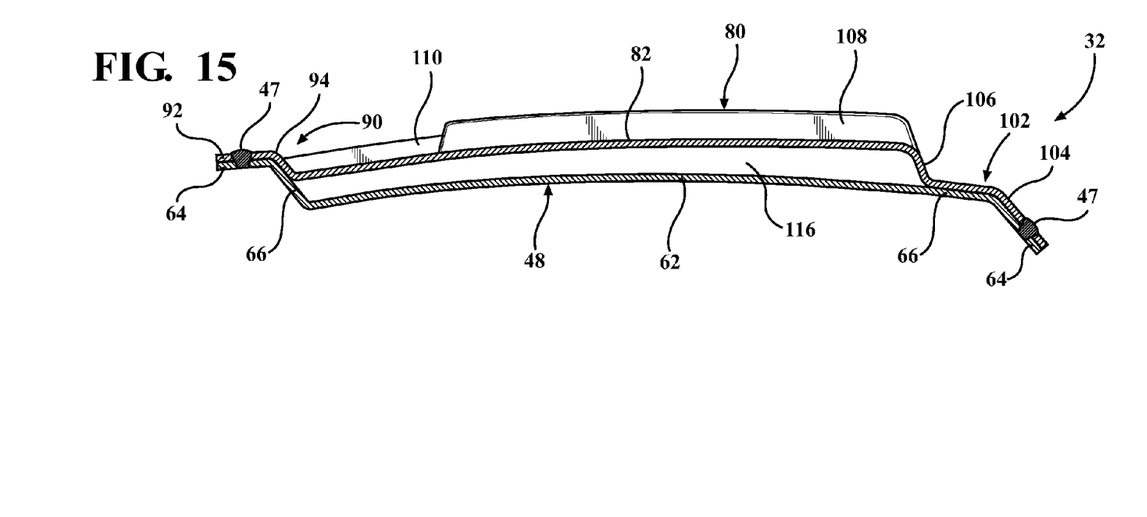
FIG. 15 is a cross-sectional view taken along lines 15-15 of FIG. 3 illustrating the juxtaposition and interconnection of the rear upper side panel and the reinforcement member.

Referring to FIGS. 2, 3 and 15, the components collectively comprising the vehicle cabin reinforcement substructure 26 are preferably separately formed of stamped steel or other suitable malleable material, and interconnected by weldments 46 or other suitable fastening methodology. The corresponding left and right side components (e.g., left C-pillar 32 and right C-pillar 34) are formed as virtual mirror images of one another. Accordingly, for the sake of brevity, only specific left side elements will be described in detail, it being understood that the description applies equally to both sides of the vehicle cabin reinforcement substructure 26.

The left (e.g., driver side) C-pillar 32 comprises a vertically elongated base member 48 which is bifurcated at its upper terminus or upper end portion 49 in a "Y" configuration to define a first longitudinally directed stub arm 58 and a second laterally directed stub arm 60. The base member 48 is sectionally shaped to define a central bridge portion 62 bi-directionally transitioning into opposed continuous mounting flanges 64 through integral interconnecting offset legs 66.

The end of the left side roof rail 38 disposed adjacent the first longitudinally directed stub arm 58 of said left C-pillar 32 is sectionally shaped to define a central bridge portion 68 bi-directionally transitioning into opposed continuous mounting flanges 70 through integral interconnecting offset legs 72 and to matingly conform with complimentary features of said first longitudinally directed stub arm 58 for attachment thereto via said weldments 46.

Similarly, the end of the rear edge roof header 36 disposed adjacent the second laterally directed stub arm 60 of said left C-pillar 32 is sectionally shaped to define a central bridge portion 74 bi-directionally transitioning into opposed continuous mounting flanges 76 through integral interconnecting offset legs 78 and to matingly conform with complimentary features of said second laterally directed stub arm 60 for attachment thereto via said weldments 46.

A reinforcement member (e.g., section shear member) 80, which is preferably formed of stamped steel or other suitable malleable material, is interconnected to the "Y" configured upper terminus of the elongated base member 48 by weldments 47 or other suitable fastening methodology. The gauge of the material employed to fabricate the reinforcement member 80 is preferably the same employed in the elongated base member 48. The reinforcement member 80 includes a central bridge portion 82 which is trifurcated to define a first outward extension 84 aligned with the vertically elongated base member 48, a second outward extension 86 aligned with the first longitudinally directed stub arm 58 and a third outward extension 88 aligned with the second longitudinally directed stub arm 60.

The central bridge portion 82 of the reinforcement member 80 forms a first outer web segment 90 circumferentially interconnecting the first and second outward extensions 84 and 86, respectively, of the elongated base member 48. The first outer web segment 90 is sectionally shaped to form one or more flanges 92 through an interconnecting offset leg 94.

The central bridge portion 82 of the reinforcement member 80 forms a second outer web segment 96 circumferentially interconnecting the second and third outward extensions 86 and 88, respectively, of the elongated base member 48. The second outer web segment 96 is sectionally shaped to form one or more flanges 98 through an interconnecting offset leg 100.

The central bridge portion 82 of the reinforcement member 80 forms a third outer web segment 102 circumferentially interconnecting the third and first outward extensions 88 and 84, respectively, of the elongated base member 48. The third outer web segment 102 is sectionally shaped to form one or more flanges 104 through an interconnecting offset leg 106.

The interconnecting weldments 47 join the flanges 92, 98 and 104 of the first, second and third web segments 90, 96 and 102, respectively, to the flanges 64 of the elongated base member 48 to exclusively support the reinforcement member 80 on the "Y" shaped upper end portion 49 of the elongated base member 48. The legs 94, 100 and 106 of the reinforcement member 80 are dimensioned and configured to space the central bridge portion 82 of the reinforcement member 80 from the adjoining central bridge portion 62 of the elongated base member 48, as identified by reference numeral 116. The central bridge portion 82 of the reinforcement member 80 has shaped upsets 108 and 110 formed therein which can direct roof crush loads received through the left side roof rail 38 into the elongated base member 48 and the rear roof header 36, delaying onset of rear window 44 failure. Furthermore, the generally circumferential arrangement of the weldments 47 further tend to direct localized roof crush loads radially inwardly toward a node indicated by a star 112, depicted by double headed arrows 114, further delaying onset of rear glass 44 failure. In effect, the reinforcement member 80 acts as a focused truss system or shear plate by locally rigidifying the upper terminus of the elongated base member (e.g., C-pillar) 48 and thereby preventing or delaying "twisting" when subjected to roof crush loads without adding significant additional structure.

Figure 6:
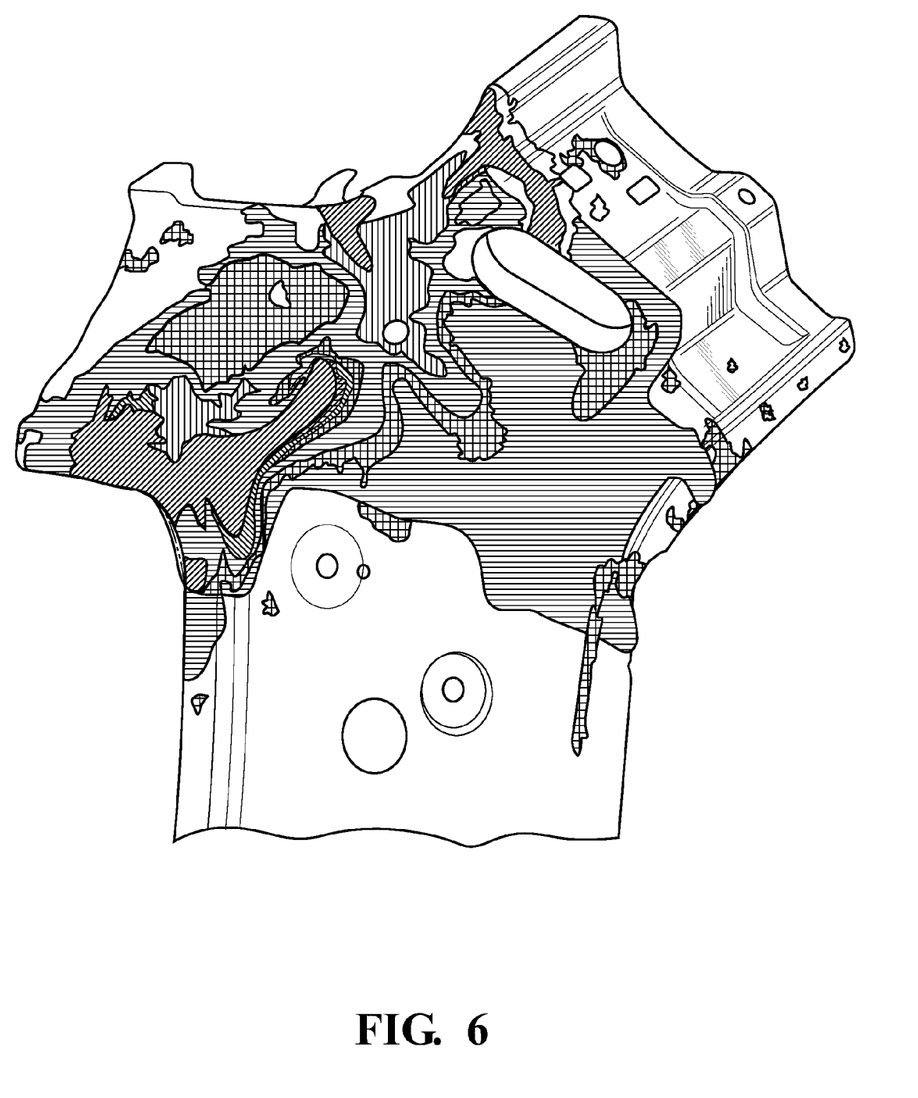
FIG. 6 is model of the upper portion of the rear side panel combined with the reinforcement member of FIG. 3 subjected to a simulated roof crush test with the test fixture of FIGS. 4 and 5 illustrating force loading imposed by such a test from an exterior perspective.

Referring to FIG. 6, a model of the upper portion of the rear side panel combined with the reinforcement member 80 subjected to a simulated roof crush test with the test fixture of FIGS. 4 and 5 illustrating force loading imposed by such a test from an exterior perspective. The resultant loading gradations are depicted in the included table.

Figure 7:
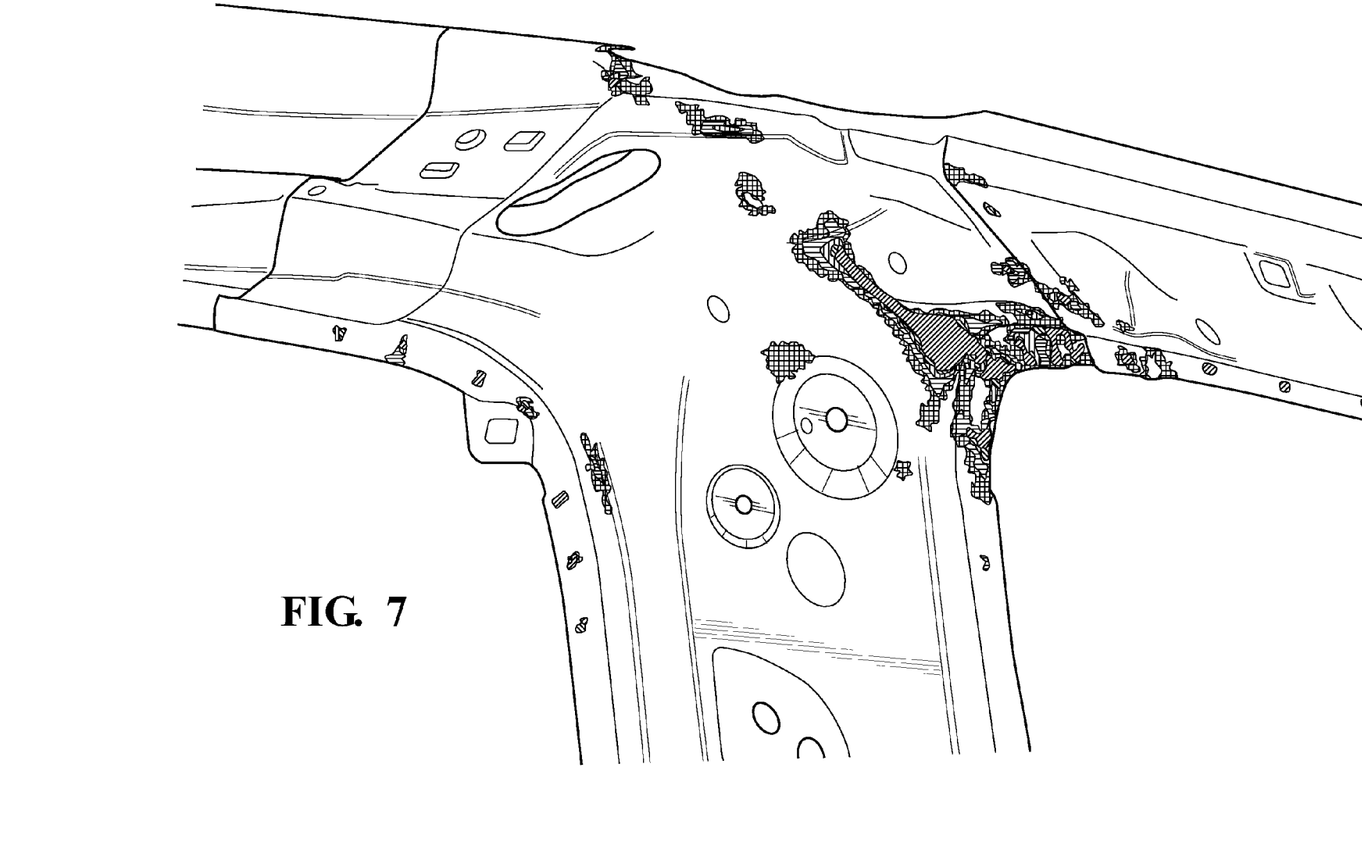
FIG. 7 is model of the upper portion of the rear side panel of FIG. 3 without the reinforcement member subjected to a simulated roof crush test with the fixture of FIGS. 4 and 5 illustrating force loading imposed by such a test at 70 mm displacement from an interior perspective.

Referring to FIG. 7, a model of the upper portion of the rear side panel of FIG. 3 without the reinforcement member 80 subjected to a simulated roof crush test with the fixture of FIGS. 4 and 5 illustrating force loading imposed by such a test at 70 mm displacement from an interior perspective. The resultant loading gradations are depicted.

Figure 8:
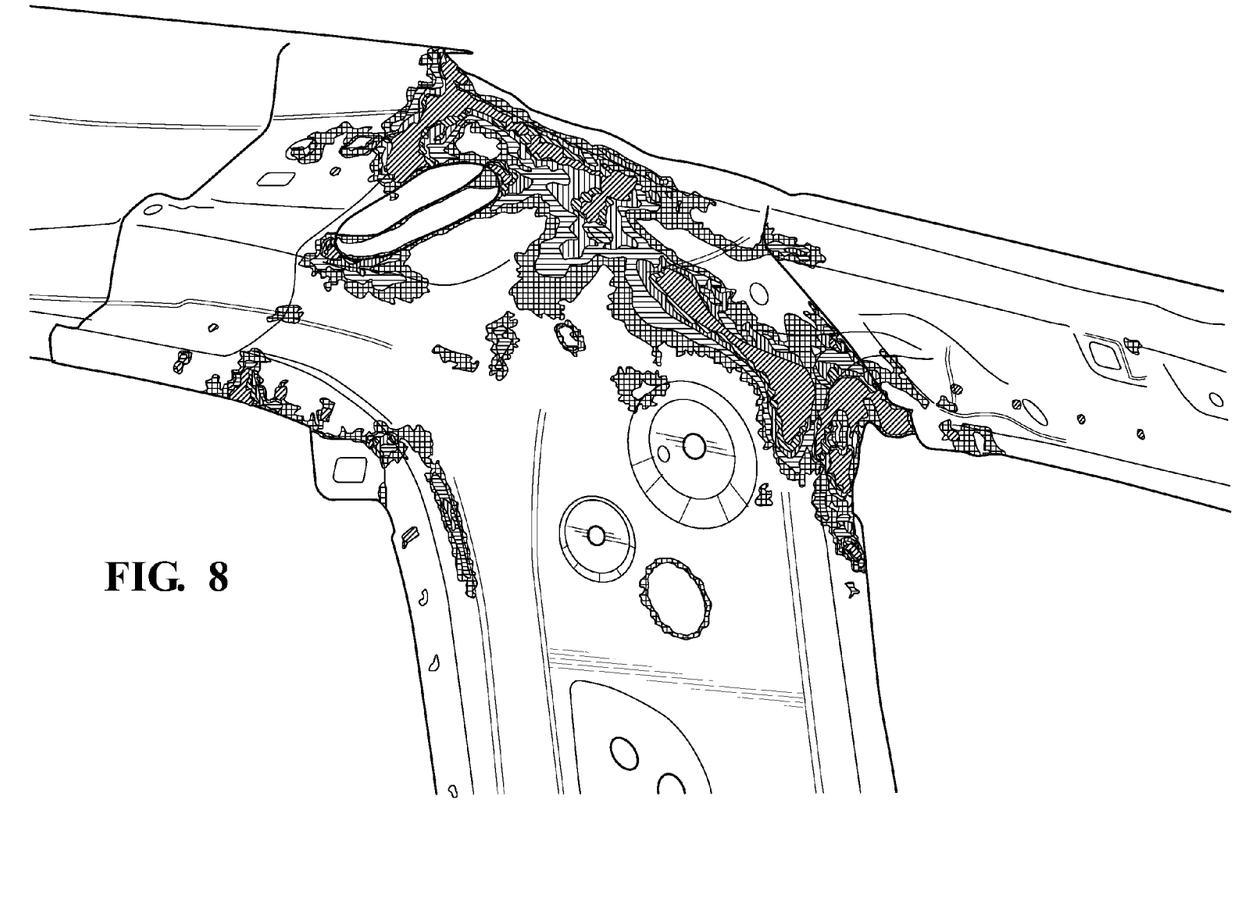
FIG. 8 is a model of the upper portion of the rear side panel of FIG. 3 without the reinforcement member subjected to a simulated roof crush test with the fixture of FIGS. 4 and 5 illustrating force loading imposed by such a test at 100 mm displacement from an interior perspective.

Referring to FIG. 8, a model of the upper portion of the rear side panel of FIG. 3 without the reinforcement member 80 subjected to a simulated roof crush test with the fixture of FIGS. 4 and 5 illustrating force loading imposed by such a test at 100 mm displacement from an interior perspective. The resultant loading gradations are depicted.

Figure 9:
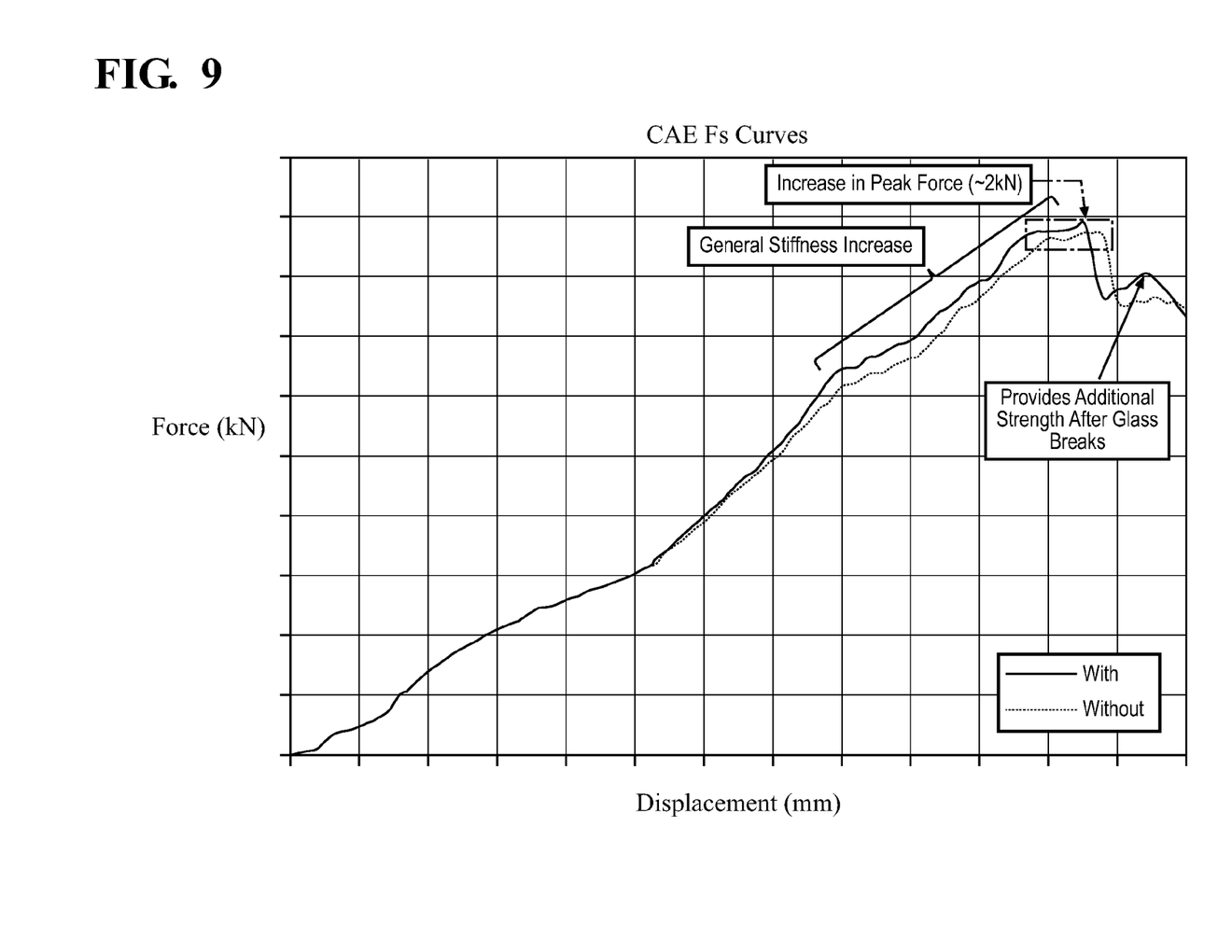
FIG. 9 is an example of a graph of results from simulated roof crush tests (i.e., with and without the structural member) illustrating strength performance advantages of the disclosed embodiment.

Referring to FIG. 9, an example of a force-displacement graph of results from simulated roof crush tests (i.e., with and without the reinforcement member 80) illustrates strength performance advantages of the disclosed embodiment wherein general stiffness is increased, peak force in increased, and additional strength is imparted after the rear glass breaks.

Figure 10:
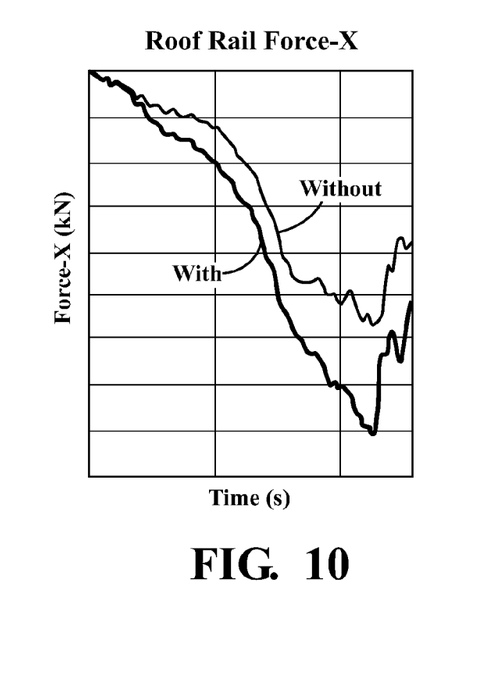
FIG. 10 is an example of a graph of results from the simulated roof crush tests (i.e., with and without the structural member) of FIG. 9 focusing on roof rail force versus time along the X axis.

Referring to FIG. 10, an example of a graph of results from the simulated roof crush tests (i.e., with and without the structural member) of FIG. 9 focusing on roof rail force versus time along the X axis.

Figure 11:
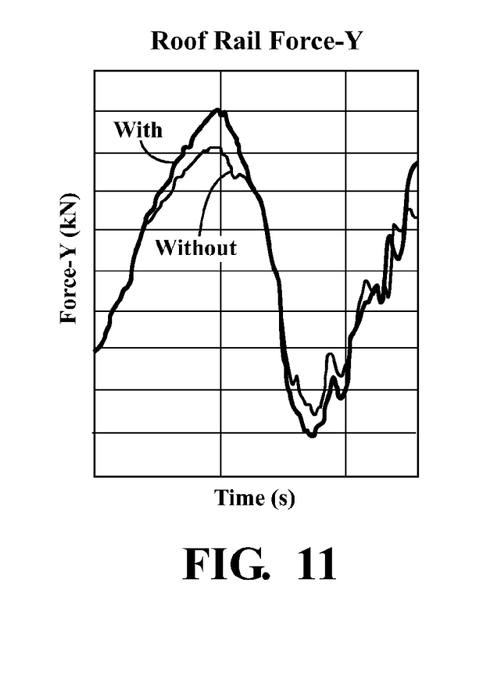
FIG. 11 is an example of a graph of results from the simulated roof crush tests (i.e., with and without the structural member) of FIG. 9 focusing on roof rail force versus time along the Y axis.

Referring to FIG. 11, an example of a graph of results from the simulated roof crush tests (i.e., with and without the structural member) of FIG. 9 focusing on roof rail force versus time along the Y axis.

Figure 12:
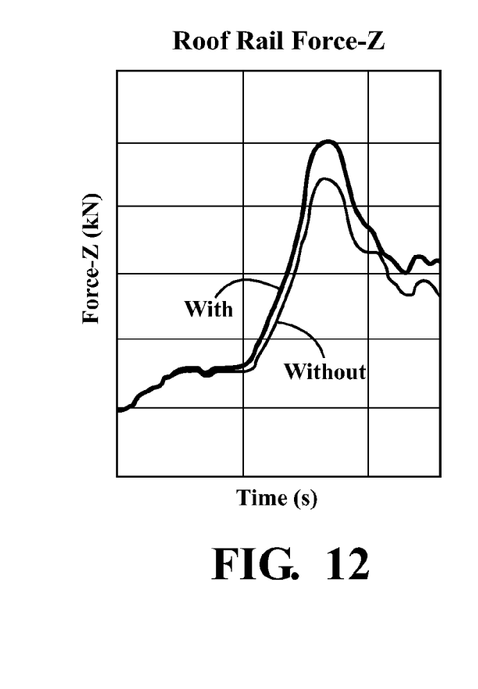
FIG. 12 is an example of a graph of results from the simulated roof crush tests (i.e., with and without the structural member) of FIG. 9 focusing on roof rail force versus time along the Z axis.

Referring to FIG. 12, an example of a graph of results from the simulated roof crush tests (i.e., with and without the structural member) of FIG. 9 focusing on roof rail force versus time along the Z axis.

Figure 13:
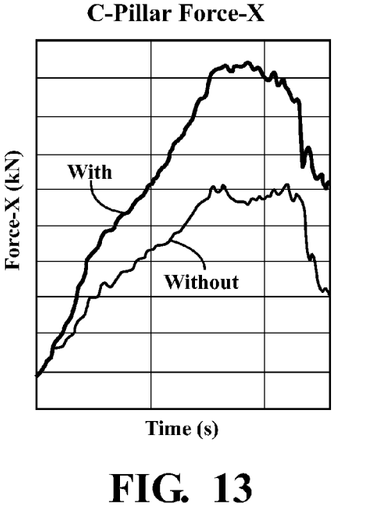
FIG. 13 is an example of a graph of results from the simulated roof crush tests (i.e., with and without the structural member) of FIG. 9 focusing on C-pillar force versus time along the X axis.

Referring to FIG. 13, an example of a graph of results from the simulated roof crush tests (i.e., with and without the structural member) of FIG. 9 focusing on C-pillar force versus time along the X axis.

Figure 14:
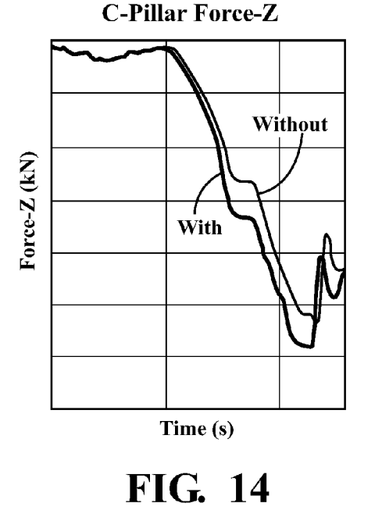
FIG. 14 is an example of a graph of results from the simulated roof crush tests (i.e., with and without the structural member) of FIG. 9 focusing on roof rail force versus time along the Z axis.

Referring to FIG. 14, an example of a graph of results from the simulated roof crush tests (i.e., with and without the structural member) of FIG. 9 focusing on roof rail force versus time along the Z axis.

It is to be understood that the present apparatus and method has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The present apparatus and method has been described in an illustrative manner, and it is to be understood that the terminology, which has been used is intended to be in the nature of words of description rather than of limitation.

Obviously, many modifications and variations of the present disclosure are possible in light of the above teachings. It is, therefore, to be understood that within the scope of the appended claims, wherein reference numerals are merely for illustrative purposes and convenience and are not in any way limiting, the present apparatus and method, which is defined by the following claims as interpreted according to the principles of patent law, including the Doctrine of Equivalents, may be practiced otherwise than is specifically described.

The invention claimed is:

1. A rear corner vehicle roof structure comprising:
   a rear pillar including a vertically elongated base portion transitioning into a bifurcated upper end portion, said upper end portion forming a longitudinally extending stub arm affixed to a side roof rail and a laterally extending stub arm affixed to a rear roof header, and comprising spaced opposed continuous flange portions intermediate said base portion and stub arms; and
   a reinforcement member including a central bridge portion trifurcated to form extensions conforming to said rear pillar base portion, said longitudinally extending stub arm and said laterally extending stub arm, said reinforcement member further including peripherally flanged web segments disposed intermediate circumferentially adjacent pairs of said rear pillar upper end portion and stub arms, said reinforcement member affixed to said rear pillar upper end portion only at discrete, circumferentially arranged attachment points between said flanged web segments and said rear pillar upper end portion continuous flange portions operative to direct roof crush induced loads at the reinforcement member radially inwardly, with said flanged web segments supporting said central bridge portion in a spaced relation from said upper end portion.

2. The rear corner vehicle roof structure of claim 1, wherein said rear pillar upper end portion comprises a central bridge portion separating said opposed continuous flange portions.

3. The rear corner vehicle roof structure of claim 1, wherein said reinforcement member has a centrally located node at said reinforcement member central bridge portion, and said discrete attachment points are operative to direct roof crush induced loads radially inwardly toward the centrally located node.

4. The rear corner vehicle roof structure of claim 1, wherein each of said discrete attachment points comprises localized weldments.

5. The rear corner vehicle roof structure of claim 2, wherein said reinforcement member central bridge portion is shaped to conform to said rear pillar central bridge portion.

6. The rear corner vehicle roof structure of claim 1, wherein said reinforcement member central bridge portion has shaped upsets formed therein operative to redirect roof crush induced loads from an axis of elongation of said side roof rail toward an axis of elongation of said rear pillar base portion.

7. The rear corner vehicle roof structure of claim 1, wherein said reinforcement member central bridge portion has shaped upsets formed therein operative to redirect roof crush induced loads from an axis of elongation of said side roof rail toward an axis of elongation of said rear roof header.

8. A vehicle roof structure comprising:
   a left rear pillar and a right rear pillar, wherein each rear pillar is longitudinally spaced from a respective left front pillar and a right front pillar, and wherein said front and rear pillars provide vertical support of said roof structure;
   a left side roof rail extending longitudinally between said left front and left rear pillars and a right side roof rail extending longitudinally between said right front and right rear pillars; and
   a front edge roof header extending laterally between said left and right front pillars, and a rear edge roof header extending laterally between said left and right rear pillars,
   wherein said left and right rear pillars each comprise a vertically elongated base portion transitioning into a bifurcated upper end portion, each of said upper end portions forming a longitudinally extending stub arm affixed to an end of an associated roof rail and a laterally extending stub arm affixed to an end of said rear roof header, and comprising spaced opposed continuous flange portions intermediate said base portion and stub arms, and
   wherein said left and right rear pillars each further comprise a reinforcement member including a central bridge portion trifurcated to form extensions conforming to said left and right rear pillar bifurcated upper end portions, said longitudinally extending stub arms and said laterally extending stub arms, each said reinforcement member further including peripherally flanged web segments disposed intermediate said rear pillar upper end portion base portion and stub arms, each said reinforcement member affixed to a respective rear pillar upper end portion only at discrete, circumferentially arranged attachment points between said flanged web segments and said rear pillar upper end portion continuous flange portions operative to direct roof crush induced loads at the reinforcement member radially inwardly, with said flanged web segments supporting said central bridge portion in a spaced relation from said upper end portion.

9. The vehicle roof structure of claim 8, wherein each said pillar upper end portion comprises a central bridge portion separating said opposed continuous flange portions.

10. The vehicle roof structure of claim 8, wherein each said reinforcement member has a centrally located node at said reinforcement member central bridge portion, and said discrete attachment points are operative to direct roof crush induced compressive loads radially inwardly toward the centrally located node.

11. The vehicle roof structure of claim 8, wherein each of said discrete attachment points comprises localized weldments.

12. The vehicle roof structure of claim 9, wherein each said reinforcement member central bridge portion is shaped to conform to said pillar central bridge portion.

13. The vehicle roof structure of claim 8, wherein each said reinforcement member central bridge portion has shaped upsets formed therein operative to redirect roof crush induced loads from an axis of elongation of said side roof rail toward an axis of elongation of said associated rear pillar base portion.

14. The vehicle roof structure of claim 8, wherein each said reinforcement member central bridge portion has shaped upsets formed therein operative to redirect roof crush induced loads from an axis of elongation of said side roof rail toward an axis of elongation of said associated rear roof header.

15. A corner vehicle roof structure comprising:
a corner pillar including a base portion and an upper end portion transitioning into a longitudinally extending stub arm affixed to a side roof rail and a laterally extending stub arm affixed to a roof header, said upper end portion comprising spaced opposed continuous flange portions intermediate said base portion and stub arms; and
a reinforcement member including a central bridge portion and peripherally flanged web segments disposed intermediate said corner pillar upper end portion base portion and stub arms, said reinforcement member affixed to said corner pillar upper end portion only at discrete, circumferentially arranged attachment points between said flanged web segments and said corner pillar upper end portion continuous flange portions operative to direct roof crush induced loads at the reinforcement member radially inwardly, with said flanged web segments supporting said central bridge portion in a spaced relation from said upper end portion.

16. The corner vehicle roof structure of claim 15, wherein reinforcement member has a centrally located node at said reinforcement member central bridge portion, and said discrete attachment points are operative to direct roof crush induced loads radially inwardly toward the centrally located node.

17. The corner vehicle roof structure of claim 15, wherein each of said discrete attachment points comprises localized weldments.

18. The corner vehicle roof structure of claim 15, wherein said reinforcement member central bridge portion has shaped upsets formed therein operative to redirect roof crush induced loads from an axis of elongation of said side roof rail toward an axis of elongation of said corner pillar base portion.

19. The corner vehicle roof structure of claim 15, wherein said reinforcement member central bridge portion has shaped upsets formed therein operative to redirect roof crush induced loads from an axis of elongation of said side roof rail toward an axis of elongation of said roof header.

* * * * *